L. Litchfield,

Shuttle.

No. 3,732. Reissued Nov. 16. 1869.

Witnesses:
S. N. Piper.
J. Rehnous

F. C. Litchfield,
Liberty Litchfield,
Libya M. Litchfield.
by their atty.
H. Hedly

N. PETERS, PHOTO-LITHOGRAPHER, WASHINGTON, D. C.

United States Patent Office.

LIBERTY LITCHFIELD, FESTUS C. LITCHFIELD, AND LIBYA M. LITCHFIELD, OF SOUTHBRIDGE, MASSACHUSETTS, ASSIGNEES OF LYDIA W. LITCHFIELD, ADMINISTRATRIX OF THE ESTATE OF LAROY LITCHFIELD, DECEASED.

*Letters Patent No.* 12,780, *dated May* 1, 1855; *reissue No.* 3,355, *dated March* 30, 1869; *extended seven years; reissue No.* 3,732, *dated November* 16, 1869.

IMPROVEMENT IN SHUTTLES FOR LOOMS.

The Schedule referred to in these Letters Patent and making part of the same

*To all persons to whom these presents may come:*

Whereas, Letters Patent, No. 12,780, dated the 1st day of May, A. D. 1855, were granted to LAROY LITCHFIELD, late of Southbridge, of the State of Massachusetts, but now deceased; and whereas, by certain instruments of writing, duly recorded in the Books of Transfer of Patent Rights of the United States Patent Office at Washington, the undersigned, FESTUS C. LITCHFIELD, LIBERTY LITCHFIELD, and LIBYA M. LITCHFIELD, all of said Southbridge, have become sole owners of the said Letters Patent, and the exclusive property covered thereby; and whereas, such Letters Patent have been surrendered and reissued, and a new patent granted on the 30th day of March, A. D. 1869, for the balance of the term of fourteen years for which the patent was originally granted; and whereas, such new patent has been extended for a further term of seven years from the 1st day of May, A. D, 1869, and it is believed by us that such new patent, by reason of a defective or insufficient specification or claims, is not fully valid or is inoperative, the defect or defects having arisen from inadvertency, accident, or mistake, and without any fraudulent or deceptive intention; and whereas, we have petitioned the Commissioner of Patents to be allowed to surrender the new patent or reissue, for a reissue thereof, upon an amended specification and claim: Now, therefore, we do hereby declare the said invention of the said LAROY LITCHFIELD to be fully described in the following specification, and represented in the accompanying drawings, of which—

Figure 2:
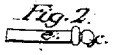
Figure 2 is a side view of a pin, around which a spring, which keeps the spindle in place, either up or down, is coiled, or extended.
Figure 3:
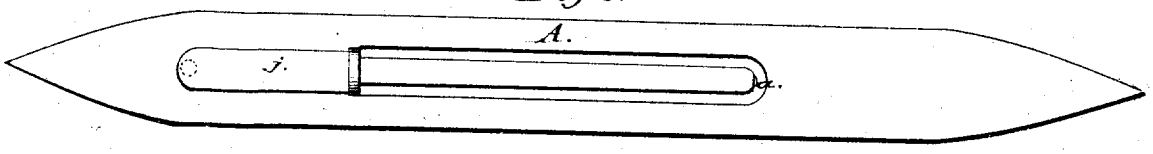
Figure 3 is an under-side view of the shuttle.

The invention in question consists mainly in a method of applying a spring to the spindle, for the purpose of holding it in place, when down within the shuttle, as well as when raised into an inclined position, so as to project from the shuttle in manner as represented by red lines in fig. 2.

Other points of invention will be hereinafter more particularly mentioned.

The body of the shuttle is represented at A, and the spindle at *a*, *b* being the pivot, or joint-pin on which the spindle turns, and by which it is connected to the body of the shuttle.

The hole in the spindle-head, for the reception of the joint-pin *b*, is arranged a little below the axis of the spindle, and the spindle or its head is extended in the rear of the said hole, in the manner as shown at *c*, such part *c* being what may be termed the arm of the spindle, it being inclined downward, as it extends back from the pin *b*, in order to make room for the helical spring *d*.

Figure 1:
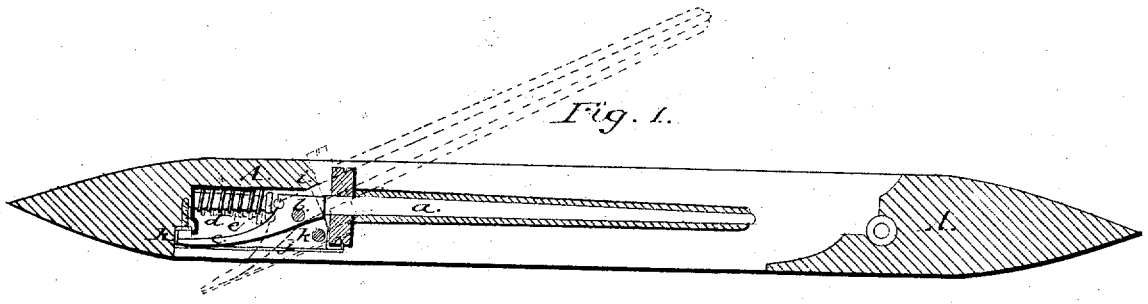
Figure 1 is a longitudinal section of a shuttle containing the invention.

The said spring is arranged within the body of the shuttle, and with respect to the heel of the spindle, in manner as represented in fig. 1.

This spring *d* abuts against the rear end of the spindle-chamber of the shuttle, and receives the pin *e*, which is inserted within the spring, and provided with a knuckle, *f*, to enter a corresponding recess formed in the back part of the heel of the spindle, and at a short distance above the axis of the pin *b*.

The spring, in its compressed state, rests against the back of the chamber, and also against a shoulder formed on the pin *e*, and in rear of its knuckle.

When the spindle is in its operative position, as shown in black outlines in fig. 1, the axis of the pin *e* stands nearly in line with that of the spindle, and the spring *d*, by exerting its force at a point above the level of the axis of the joint-pin *b*, will force the arm *c* close against a pin or screw, *h*, which is screwed into the body of the shuttle, and arranged at the back of the chamber thereof, in manner as represented.

By such means the spindle will be held firmly in its lowermost position.

The bearings of the arm *c* may be formed in the body of the shuttle, but it is preferable to make use of means by which the said bearings may be moved or adjusted vertically, and to this end the screw *h* is employed. By screwing it either up or down, as circumstances may require, the spindle may have its point readily adjusted to a proper height or position within the body of the shuttle.

When the spindle is thrown up into the position exhibited in red lines, the screw will be exposed so that access to it may be readily had in order to revolve it.

When the spindle is in the last-named position, the knuckle *f*, or its axis, will stand at a level somewhat below that of the joint-pin *b*, and, through the force of the spring, will hold the spindle against a bearing, or abutment, *i*, formed and arranged in manner as represented in fig. 2.

The spring-catch, for confining the bobbin to the spindle, is represented at *j*, it being attached to the rear part of the arm *c*.

While the spindle is being raised, the spring-catch will be thrown out of engagement with the groove of the bobbin-head, by being forced in contact with a disengaging-pin, *k*, arranged in the body of the shuttle, in manner as represented.

While the bobbin and the spindle are being moved down into their lowest positions, the spring-catch becomes engaged with the bobbin-head, so as to hold the bobbin upon the spindle.

The pin *k* is so placed that the spring-catch, for holding a bobbin to the spindle, will not come in contact with the pin until after the spindle may have been elevated some distance, and therefore the catch will hold equally well a large or a small-headed bobbin, without interference with the firmness with which the spindle may be held in position by the helical spring. In this shuttle the said firmness is amply provided for.

The length of the arm *c* is such as to prevent injurious lateral play of the spindle.

When necessary, a spindle can easily be removed from the shuttle, and another put in its place, and be easily adjusted by the regulating-screw.

The shuttle can be as cheaply constructed as most any other one, as the spindle, or all of the rear part of it and the pin *e*, may be of malleable cast-iron, and the spring *j* may be of light steel plate, riveted to the arm of the spindle.

A cop-shuttle, containing the invention, would differ only from that described, in being without the spring-catch.

What we claim as the invention of the said LAROY LITCHFIELD, is as as follows, viz:

The combination and arrangement of the spring *d* with the shuttle A, the spindle *a*, the joint-pin *b*, the arm *c*, and the abutment or stop *h*.

Also, the combination and arrangement of the pin *e* and its head *f* with the shuttle A, the spring *d*, the spindle *a*, the joint-pin *b*, the arm *c*, and the abutment, or stop *h*.

Also, the combination of means of adjusting the stop *h*, in manner as described, with such stop, the arm *c*, the spindle *a*, the pin *b*, and the spring *d*, arranged with the heel and the joint-pin of the spindle, and in the shuttle, as set forth.

Also, the arrangement of the spring *d*, so as to rest on a bearing at or near its rear end, and to press toward the head of the spindle, in or about in the direction of the axis or length of the spindle.

Also, a loom-shuttle, provided with a spring, substantially as described, to act on the head of the spindle, and hold it in either or each of its extreme positions, and having, also, mechanism, substantially as described, to act on the bobbin-head catch, to liberate it from the bobbin-head, while the spindle is being raised in the shuttle, and admit of it catching upon the said head while the spindle is in the act of being depressed into the shuttle.

FESTUS C. LITCHFIELD.
LIBERTY LITCHFIELD.
LIBYA M. LITCHFIELD.

Witnesses:
SYLVESTER DRESSER,
JOHN M. CHENEY.